United States Patent

[11] 3,617,364

| [72] | Inventors | Chester P. Jarema<br>Detroit;<br>Leonard M. Niebylski, Birmingham, both of Mich. |
|---|---|---|
| [21] | Appl. No. | 774,756 |
| [22] | Filed | Nov. 12, 1968 |
| [45] | Patented | Nov. 2, 1971 |
| [73] | Assignee | Ethyl Corporation<br>New York, N.Y. |

[54] PLASTIC-COATED METALLIC FOAMS
10 Claims, 1 Drawing Fig.

[52] U.S. Cl. .................................................. 117/132 B,
117/132 BE, 117/132 BF, 117/132 BS, 117/132 CF, 117/136, 161/160, 161/183, 161/189, 161/190, 161/207, 161/213, 161/214, 161/215, 161/216, 161/218, 161/220, 161/406

[51] Int. Cl. ................................................ B32b 15/08
[50] Field of Search.......................................... 75/20; 117/99, 132, 161, 126 GR, 75, 5.3; 161/213; 260/80.7

[56] References Cited
UNITED STATES PATENTS

| 2,076,295 | 4/1937 | Curs et al. ................... | 106/22 |
| 2,527,162 | 10/1950 | Vanderbilt et al. ........... | 260/80.7 |
| 2,895,819 | 7/1959 | Fiedler ......................... | 75/20 |
| 2,909,450 | 10/1959 | Goldstein ..................... | 117/132 UX |
| 2,932,583 | 4/1960 | Grana .......................... | 117/132 X |
| 2,937,938 | 5/1960 | Fiedler et al. ................ | 75/20 |
| 2,983,570 | 5/1961 | Lux .............................. | 117/132 X |
| 3,161,518 | 12/1964 | Deal et al. .................... | 117/132 X |
| 3,297,431 | 1/1967 | Ridgway ...................... | 75/20 |
| 3,300,296 | 1/1967 | Hardy et al. ................. | 75/20 |
| 3,345,205 | 10/1967 | Raech .......................... | 117/132 X |
| 3,440,132 | 5/1969 | Koubek ........................ | 117/126 X |

*Primary Examiner*—William D. Martin
*Assistant Examiner*—Harry J. Gwinnell
*Attorney*—Donald L. Johnson ABSTRACT: The properties of articles fabricated from foamed metals (such as foamed aluminum) are enhanced by coating surfaces thereof with plastic materials, e.g. acrylonitrile-butadiene-styrene polymers. For example, the plastic coating improves the physical properties, and enables the article to be joined to another foamed metal article, or to a metal sheet, wire, glass, rock or other material. The organic coat gives improved strength to such joint.

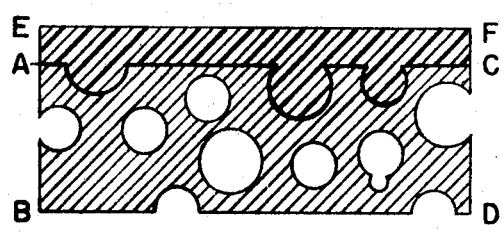

PLASTIC-COATED METALLIC FOAMS

BACKGROUND OF THE INVENTION

Foamed metals have been described in the prior art, see, for example, U.S. Pat. Nos. 2,895,819, 3,300,296, and 3,297,431. In general, such foams are prepared by adding a gas-evolving compound to a molten metal, and heating the resultant mixture to decompose the gas-forming compound to prepare blowing gas. The gas causes the metal to foam by expansion. After blowing, the resultant body is cooled to produce a foamed solid. Such gas-forming solid may be a metal hydride such as $TiH_2$, $ZrH_2$ or magnesium, aluminum, or lithium hydride, U.S. Pat. No. 2,983,597.

SUMMARY OF THE INVENTION

It has been discovered that foamed metal bodies produced by methods—such as generally described and referred to above—are materially enhanced by coating them with a plastic material.

For example, the coating adds strength, especially in such cases where the coating is imbibed into the surface of the metal by filling the cavities on the surface. (Such cavities can be relatively large to microscopic in size.) Second, such coatings can provide a means for attaching a foamed metal to another body. This is done by melting the plastic coating, pressing it to the surface to be attached so the molten plastic sticks to both surfaces to be bonded, and then cooling. Furthermore, the coating can be decorative. Moreover, the surface can be altered to confer different properties by a proper choice of the coating polymer. Thus, to make a more or less "slippery" surface, a film of Teflon can be fused on the surface of the foamed body. To make the body elastic or "springy," a rubber can be fused thereon. To make the surface sticky, an adhesive can be used. The adhesive layer can be covered for protection prior to use by a sheet of paper, cloth or the like.

In addition, the plastic coating can markedly improve other properties. Thus, coated plastics of this invention have less tendency to absorb liquids such as water. Compressive, flexural, shear, and tensile strengths are improved; friability is decreased.

The FIGURE, which is not to scale, illustrates this invention. In the FIGURE, ABCD represents a section through a foamed metal body, said section being taken by cuts along AB, BD, and CD. The circles and partial circles within ABCE represent cross sections of bubbles in the foamed substrate. The bubbles were made by blowing gas during the foaming process. As can be seen, these bubbles can be of equal or different sizes, wholly separated, or joined together. It is not necessary that the bubbles be spherical as shown.

As illustrated, there are three cavities in Surface AC of the foamed substrate (in the illustrated section). Of course, these cavities can be formed during the blowing process and the number of cavities can be more or less in any given section.

ACFE represents a layer of plastic on Surface AC of the foamed substrate. As illustrated, the plastic layer extends into the cavities in the coated surface. This invention covers surfaces having cavities which are partially filled, substantially filled, or entirely filled.

DESCRIPTION OF PREFERRED EMBODIMENTS

The plastics which can be used to coat-foamed metals according to this invention can be chosen from a wide variety of materials.

The following illustrative but nonlimiting outline serves to demonstrate what types of plastics can be used in polymer-coated foamed metals provided by this invention.

A. Derivatives of Natural Products
   Cellulose nitrate, cellulose acetate, cellulose acetate-butyrate, ethyl-cellulose, rubber, vulcanized rubber, chlorinated rubber.

B. Phenolic Materials
   Bakelite, phenol-formaldehyde novolacs and resoles, A-stage, B-stage, and C-stage resins.

C. Other Formaldehyde-based Polymers
   Condensation products of formaldehyde with urea or melamine.

D. Alkyd Resins
   Condensation products of alcohols such as glycerine, ethylene glycol, diethylene glycol or pentaerythritol with succinic, adipic, citric, sebacic, azelaic, phthalic, terephthalic, or maleic acid.

E. Epoxides and Phenoxy Resins
   Alkaline condensation product of epichlorohydren with bisphenol A.

F. Silicones

G. Furan Polymers
   Polymers of furfuryl alcohol or furfural, furfural-phenolics, urea-fomaldehyde resins containing furfuryl alcohol.

H. Nylons
   Condensation products of diacids with diamines.

I. Polyamides
   Nylon-6

J. Polyurethanes
   Reaction products of toluene-2,4-diisocyanate and polyhydric alcohols K. Thiokols L. Polycarbonates
   Produced by phosgenation of dihydroxy aromatics such as bisphenol A.

M. Polysulfones
   Reaction products of bisphenol A and bis-(p-chlorophenyl)sulfone.

N. Chlorinated Polyester
   Produced by polymerizing 3,3-bis(chloromethyl)-1-oxacyclobutane in liquid $SO_2$ with $BF_3$.

O. Acetal Polymers
   Delrin, Celcon

P. Polyphenylene Oxide

Q. Polyimides
   Produced by condensation of dianhydrides such as pyromellitic anhydride and polyamines such as 4,4'-diaminodiphenyl ether.

R. Polyxylenes and Polyoxyethylenes

S. Polyolefins
   Polyethylene, polypropylene, isotactic poly-1-butene, copolymers of ethylene and vinyl acetate, methyl acreylate, propylene, and acrylic acid.

T. Polystyrene

U. Vinyl Polymers
   Polyvinyl chloride, polymers of unsaturated esters such as methyl methacrylate, allyl esters, ethyl methacrylate, vinyl acetate. Copolymers of vinyl chloride and vinylidene chloride, polyvinyl acetals.

V. Fluorinated Ethylene-propylene, Tetrafluoroethylene and Related Fluorinated Materials W. Poly (alkyl vinyl ethers), Polycarbazole, and Polyvinylpyrollidones.

The plastic or polymeric coating agent(s) need not be pure but in many instances are advantageously admixed with other materials. Thus, stabilizers, antioxidants, antiozonants, dyes, fillers, antistatic agents, antitack and slip agents, Bacteriostats, brighteners, flame retardants, U.V. absorbers, and plasticizers can be used in the plastic or polymeric coats. For example of such materials known in the art one can refer to tables in 1968 edition of Modern Plastics Encyclopedia, McGraw Hill Inc., New York, N.Y. Such tables (in that publication) as those beginning on
   a. page 503—(antioxidants)
   b. page 500—(antistatic agents)
   c. page 496—(colorants)
   d. page 491—(organic peroxides)
   e. page 466—(plasticizers)
   f. page 494—(solvents)
   g. page 510—(stabilizers)
   h. page 508—(ultraviolet absorbers)

are incorporated by reference herein as if fully set forth. In addition, the plastic can be mixed with other substances such as silicon carbide, ground glass, or similar substance to render the coating layer abrasive or nonskidding.

The organopolymers can be employed singly or in combination. When used in combination, two, three, four or more of the above types of resins can be variously combined. For example, the coat can be a more or less homogeneous mixture of plastics or two or more plastics can be added to the foamed body in successive layers. Thus, laminar coats are an embodiment of the invention.

For example, the use of successive coats can form bodies having improved properties and/or bodies having acceptable properties at lower costs. Thus, the foamed metal can be first treated with a resinuous material which seeps into the cavities on the surface. More particularly, this first coat can, for example, be applied as a liquid, such as a solution of a polymer in an organic solvent. Afterwards, the solvent—which facilitates seepage into the pores of the metal foam—is then allowed to evaporate, leaving the polymer coat on the foam. Alternatively, the first treatment can be with a monomer (or solution, emulsion, or suspension thereof) followed by polymerization of the monomer on (and in the surface cavities) of the foam. If the monomer is applied together with an organic solvent, the solvent can be removed either before or after the polymerization, as desired. Monomers and polymers can be added by spraying, dipping or rolling.

Continuing the building of a laminar coat, other layers of the same or different polymeric materials can be overlayed on the first coat.

In addition to polymeric materials, other types of substances can be overlayed on the first layer.

Thus, for example, one or more layers of a plastic, such as a phenol-formaldehyde resin, can be applied to a foamed aluminum sheet. Next, a sheet of aluminum foil is bonded to the plastic coating, and then (optionally) overlayed with another layer of plastic. Next, a paper is bonded to the article—which paper optionally has a decorative design on the upward surface. The paper is then coated with a transparent, resistant plastic coat which protects the paper design from $H_2O$, air, etc. The resultant foamed sheet is useful as a building panel "sandwich" wherein the foamed aluminum portion provides lightweight, structural strength and the coated paper surface yields an aesthetically pleasing decorative effect. Such sandwich composite can be used for interior or outer walls.

The layers of materials built up on a coated, foamed metal body of this invention need not be wholly integral. For example, such layers built up on the coated surface can be a plastic foam. The coated surface provides a better bond between the foamed plastic and the foamed metal.

Thus, for example, a relatively flat surface of a foamed metal sheet is coated with a polymeric coat which is imbibed into the foam surface and forms a relatively smooth surface on the foamed body. This is then overlayed with a tacky overcoat of adhesive material so that the adhesive surface is exposed.

Next, (temporary, if desired) sides are provided around the metal sheet so said sheet forms with the sides, an open boxlike structure with the adhesive surface being exposed 'in' the box. (In other words, the bottom of the boxlike structure is the foamed metal sheet.) Then, a foamable plastic composition is placed on the adhesive surface to the desired depth, the sides serving to confine the foamable composition so there is minimal spillage. Thereafter, the plastic composition is allowed to foam and the adhesive surface provides a bond between the plastic and metal foams. The plastic foam can be flexible, rigid, or semirigid as desired.

These composite plastic and metal foams have many desirable utilities. Thus, they can be used in the walls of vehicular compartments. When so used, the metal foam is 'outside' while the plastic foam is on the inside. With such configuration, the metal foam can pick up much shock should there be an impact. The plastic foam on the inside has more 'give' than the metal foam, and it better protects freight or passengers inadvertently jostled against the compartment walls during impact.

Moreover, composite plastic metal foams can be used as flooring. In this instance, the foamed metal provides structural strength. The plastic foam adherent thereon is a built-in pad for carpeting. If desired, the plastic foam surface can have the carpeting prebonded thereto, and/or noncoated surfaces of the metal foam body can have tongues and grooves (or some other surface configuration) provided to facilitate laying.

Of course, more than one surface of the metal foam can have a plastic foam bonded thereto. Thus, for example, opposing surfaces can be provided with an adherent plastic foam to form a 'sandwichlike' structure.

Illustrative but nonlimiting plastic foams which can be bonded to a metal foam according to this invention are polystyrene (expanded beads), polyurethanes, and vinyl-containing foams such as described in Alzner et al. and Klopfer, U.S. Pat. Nos. 3,338,845, and 3,338,846, respectively.

As illustrated above, polymeric coast applied to foamed metals according to this invention can be used as bonding agents to bond other materials to a foamed metal article. According to one embodiment of this invention, the material so bonded need not provide a uniform surface. Thus, for example, a polymeric coat which is meltable can be applied to a surface of the foamed metal article. This can then be melted to form a tacky surface. Into this, crushed rock can be embedded and the surface then cooled to form a foamed metal article having an irregular surface provided by the crushed rock 'coat'. These articles provide a new artistic medium. Moreover, by varying the colors of the crushed rock, foamed metal sheets can provide an extremely eye-pleasing wall unit. As desired, the color pattern of such curtain walls can be chosen to provide a "checkerboard," variegated, mosaic, or combined effect.

Curtain walls and other structural units made from plastic-coated metal foams according to this invention need not have surfaces unaffected by atmospheric or environmental conditions. In fact, this invention encompasses embodiments where changes due to the environment are used advantageously. Thus, one embodiment of this invention comprises a foamed metal structural unit having a plastic coating thereon containing a phosphorescent or fluorescent material. Such structural units glow in the dark after being exposed to light or fluoresce. Compounds such as acridine dyes, Rhodamine B and Rhodamine 6G as well as other materials discussed in Kirk-Othmer's Encyclopedia of Chemical Technology, 2nd Edition, (in the section under "Luminescent Materials") can be used.

In addition, electrically conducted wires can be embedded into the plastic layer attached to the foamed substrate. This provides a curtain wall panel which can be used to heat a room by radiant heat when electric current is called to flow through the resistance wires.

Similarly, materials which change color upon exposure to different amounts of moisture can be stuck in the plastic coat and exposed to the environment. Salts such as cobaltous chloride and bromide can be used in this manner.

A plastic layer can be applied to the foamed metal body by cold molding. According to this technique, an organic composition is admixed with a phenolic resin dispersed in a solvent. This is admixed with a filler such as asbestos fibers, silica, or magnesia. The resultant mass, where possible, is preshaped to the approximate shape of the finished article. Next, the composition and the foamed metal body is put into a mold. The composition and foamed metal substrate is then pressed together under pressure to bond the polymeric-containing material to the foamed metal substrate. There is no heating or cooling cycle.

Alternatively a plastic layer can be applied by hot-compression molding. This technique is best employed for thermosetting compositions, because thermoplastic materials require cooling before removal of the article and preheating before receiving the next charge. This adds to expense because of the time lost.

In general, the charge and the foamed metal substrate are placed in a heated mold, the mold is closed, generally under low pressure, until pressure is exerted on the material. The charge becomes plastic and under increased pressure is forced to fill cavities in the surface of the foam substrate. The molded article is kept under pressure until cured. After that, the mold is opened and the molded part removed.

The charge is usually beads, scraps, granules, or it may be tableted or preformed. Preforming is advantageous when flow is poor, such as with polytetrafluorethylene.

The charge can be preheated prior to insertion in the mold. Electronic, steam, and air preheating are art-recognized methods. Molding is usually carried out at 145°–380° C. More preferably, temperatures from 145°–200° C. are used. The pressure utilized can be from, say, 300–800 p.s.i.g.; usually it is best to use pressures from 500–5000 p.s.i.g. Low pressures can be used while the mold is being closed and higher temperatures can be used during molding.

Transfer molding techniques such as those described on pages 587–589 of Golding, Polymers and Resins, D. Van Nostrand Co., Inc. New York (1959) can be used.

All types of foamed materials can be used as substrates for this invention. However, a highly preferred embodiment is plastic-coated foamed aluminum. The aluminum can be alloyed with various metals. Thus, it can contain up to about 50 percent of magnesium, manganese, or copper. Foamed aluminum containing up to about 10 weight percent lead alloy therewith is a preferred embodiment because such foamed aluminums have superior sound-dampening properties.

The following alloys yield foams suitable for this invention when used in a process employing a titanium or zirconium hydride as a blowing agent. Suitable techniques are the processes of the prior art set forth in the patents cited herein in the section "Background of the Invention". Moreover, said alloys yield suitable foams when the molten alloy is made more viscous by a suitable viscosity-increasing agent.

Alcoa alloy

Alcoa alloy 7075—(1.6% Cu, 2.5% Mg, 0.3% Cr, 5.6% Zn, remainder Al)
2024—(4.5% Cu, 0.6% Mn, 1.5% Mg, remainder Al)
5086—(0.45% Mn, 4.0% Mg, 0.1% Cr, remainder Al)
6063—(0.4% Si, 0.7% Mg, remainder Al)
Almag 35 (6–8% Mg, in Al)
1000 series Al (99.6% minimum Al)
2011—(5.5% Cu, 0.5% Pb, 0.5% Bi, remainder Al)
2218—(4.0% Cu, 1.5% Mg, 2Ni, remainder Al)
3005—(1.2% Mn, 0.4% Mg, remainder Al)
4042—(12.2% Si, 0.9% Cu, 1.1% Mg, 0.9% Ni, remainder Al)
4043—(5% Si, 95% Al)
8280—(1.5% Si, 1.0% Cu, 0.5% Ni, remainder Al)
Magnalium—70% Al, 30% Mg)

EXAMPLE 1

The following is a general procedure illustrating preparation of plastic-coated metal foams by a hot-compression-molding technique.

A sample of a foamed aluminum having a density of 10–40 percent of the density of aluminum ingot is employed. Such samples have approximate dimensions of 6×2×1 inches. At least one of the 6×2 inches surfaces is characterized by having a "pitted" configuration. Such pitted configuration can be gained by preparing the sample by making a section through a foamed aluminum body of said density wherein the pore size averages one-sixteenth–three thirty-seconds of an inch and the pore size of, say, 80 percent of the pores range from about one-eighth to about one sixty-fourth.

From 5–15 g. of Acrylonitrile-butadiene-styrene resin is placed on the 6×2 inches surface above described. (A resin used was Tybrene 27, Natural 7 supplied by Dow Chemical Co. Such plastic is a solid in pellitized form.) Where desired, the pellets are admixed with approximately 2 percent by weight of a dye. Dyes found suitable are the following, supplied by Allied Chemical Corp.

BC 70920—plasto blue G
BC 70921—plasto blue RDA BC 70922—plasto green B BC 70923—plasto orange R BC 70924—plasto red B
BC 70925—plasto yellow MGS
BC 70926—plasto yellow Y The foamed metal substrate, plastic (and dye) are placed in a hydraulic press whose 6×6 inches platens have previously been heated to 475°–500° F. The material is so placed in the press that the plastic (and dye) is on top. Between the top platen and the pellets is placed a covering sheet of a somewhat heavy gauge aluminum foil, say, 15-mil thick. The press is barely closed, say, to about 50 pounds per square foot and allowed to remain in this configuration for about 3–5 minutes. In this manner the hot top platen heats the plastic.

Thereafter, additional pressure can be applied, say, an additional 10–50 pounds per square foot, to cause the plastic to melt and flow over the entire top surface of the foamed aluminum. When the entire top surface is covered with the plastic, the plastic-coated foam is removed from the press. This yields a plastic-coated foam to which is attached the heavy foil.

This object is then cooled, optionally with water or other coolant such as dry ice. The aluminum foil can be removed, if desired.

Using about 5 g. of resin on the surface above described, yields a coated foam having a thin coat of plastic thereon. In other words, the tops of the walls of the pore surfaces are visible through the plastic. This gives an aesthetically pleasing effect similar to a cloisonne, with most of coat embedded into the surface cavities of the foam filling them up to make a smooth surface. Of course, more plastic than 5 g. yields a thicker coat on the surface of the metal foam.

The process described above lends itself well to scale-up. Thus, larger coated foamed bodies can be made to order if comparatively larger amounts of plastic (and dye) are employed between larger platens on bigger samples of substrate.

The above procedure has been extended to a thermosetting melamine resin. The platen temperature was 375° F. About 5 g. of undyed melamine resin was used and the resultant plastic-coated foam surface was white-gray having a marblelike appearance.

Similarly, the above procedure was applied to a methacrylate resin which had been admixed with a hardener. A clear plastic coat was obtained.

Similarly, a polypropylene coat was laid down using a platen temperature of 400° F.

In the cases where the above technique was employed, the polymeric material had filled cavities in the treated surface.

Utilizing the low pressures employed in this example, coated materials were made from other samples of foamed aluminum in which the cavities were larger than those mentioned above. In one instance, the cavities, in general were from three thirty-seconds–five thirty-seconds inch in size. Utilizing this material a commensurately greater amount of plastic was employed.

In instances where the above general procedure was employed, visual inspection demonstrates that the cavities in the surface so treated are well filled with plastic material to depths of the cavities present in the surface.

For much smaller cavities, it is expedient to increase the compression and/or temperature pressure to force the plastic to flow into the smaller pores. Pressures in the range of 10–200 p.s.i.g. are advantageously employed. Usually, it is preferred to use a pressure less than that which compresses the foamed substrate, but higher pressures can be employed if desired to materially alter the treated surface by admixing the plastic coat with a crushed-foamed surface.

EXAMPLE 2

A liquid polyester resin (Michigan Fibreglas Sales, Inc. No. 130) was admixed with a hardener (Michigan Fibreglas Sales, Inc. EH No. 37) in the ratio of four parts resin to one part hardener. This was then spread upon a foamed aluminum sample having a pore size of from about one-sixteenth to about one thirty-second as described in example 1. (Brushing, rolling, or spraying are suitable application techniques.) After application, a fiber glass mat was placed on the resin surface and the resin allowed to harden. After drying, another coat of resin was applied to the top of the fiber glass. This was allowed to dry and was sanded. Additional layers of resin and fiber glass can be applied before or after sanding.

EXAMPLE 3

This example gives an illustrative general procedure for preparing a plastic-coated metal foam having items embedded in the plastic layer.

Foamed aluminum samples are prepared as in example 1, utilizing 5–15 g. of ABS resin on a 6×2 inches foamed metal surface.

Thereafter the coated material (coated side up) is put back in the press which has the platens preheated to a temperature which will soften the plastic coat. A suitable platen temperature is 475°–500° F.

After the plastic-coated material is softened, a material to be embedded in the plastic coat is placed on the softened surface. Illustrative substances are quartz, marble, or enamel chips, crushed rock, metal flakes, wires, or turnings and glass wool, or beads. Pressure of 10–100 pounds per square foot is then impressed, forcing the substance to embed in the coat. Pressure is released and the resultant object allowed to cool.

Using the above procedure, two foamed aluminum bodies can be joined by placing one body into a softened coat on another body. In this way, plastic is between the butted surfaces. Foamed aluminum bodies can also be joined using plastic coats on top, bottom, and/or sides of both conjoined bodes with plastic between or not present between the butted surfaces as desired.

EXAMPLE 4

Some foamed metal samples have a large number of open cells and/or small imperfections in the walls of apparently closed cells. These allow fluid to penetrate freely from surface cavities into the body of the foamed metal. Utilizing such samples, plastic coats can be applied which penetrate to any desired depth in the foamed body.

This is illustrated by the following procedure. A mixture of Polyclear, an acrylic substance supplied by Transene Co. Inc. of Rowley, Massachusetts, is mixed with a hardener as directed by the supplier. If this mixture is immediately applied to foamed aluminum having small imperfections in the cell walls, the quite fluid mixture will penetrate to about 70 percent of the depth of a 1-inch thick foam before hardening. Alternatively, if the mixture is allowed to set up for about 15 minutes before application, the penetration is lessened by 20–30 percent.

If the mixture is allowed to set up for longer periods, the penetration can be further lessened.

Carvable epoxy coats can be made from slurries of epoxy resins coated on foamed metals. The epoxy-foam composite can be used for tooling needs such as for numerical control cutting machines.

We claim:

1. As an article of manufacture, a foamed metal body having a surface thereof coated with a relatively thin layer of organopolymeric plastic coating.

2. An article of claim 1 wherein said organopolymeric plastic coating at the interface of said coating and said foamed metal body has penetrated into cavities in said surface of said body.

3. An article of claim 1 wherein said organopolymeric plastic coating consists substantially of an acrylonitrile-butadiene-styrene resin.

4. An article of Claim 1 wherein said foamed metal body is foamed aluminum.

5. An article of claim 4 wherein said foamed aluminum has a density of about 10 percent by weight of that of cast aluminum.

6. An article of claim 5 wherein said foamed aluminum is an alloy having 6–8 weight percent magnesium.

7. An article of claim 6 wherein said foamed aluminum has an average pore size of from about one thirty-second to about three thirty-seconds of an inch.

8. An article of claim 7 having a surface coated with acrylonitrile-butadiene-styrene resin.

9. An article of claim 7 having a surface coated with a resin that is, a condensation product of formaldehyde and melamine.

10. An article of claim 7 coated with a fiber glass reinforced polyester resin.

* * * * *

PO-1050
(5/69)

UNITED STATES PATENT OFFICE
CERTIFICATE OF CORRECTION

Patent No. 3,617,364      Dated November 2, 1971

Inventor(s) Chester P. Jaroma et al

It is certified that error appears in the above-identified patent and that said Letters Patent are hereby corrected as shown below:

Column 1, line 46, "ABCE" should read -- ABCD --

Column 4, line 20 "coast" should read -- coats --

Column 5, line 39 "Alcoa alloy" should be deleted as it appears twice

Column 5, line 49, "2Ni" should read -- 2 % Ni --

Column 5, line 71, inch (") should be inserted after -1/64 -

Signed and sealed this 2nd day of May 1972.

(SEAL)
Attest:

EDWARD M. FLETCHER, JR.      ROBERT GOTTSCHALK
Attesting Officer      Commissioner of Patents